(12) United States Patent
Lille

(10) Patent No.: US 7,841,067 B2  
(45) Date of Patent: Nov. 30, 2010

(54) METHOD FOR MANUFACTURING A TRAILING SHIELD STRUCTURE FOR A PERPENDICULAR MAGNETIC WRITE HEAD

(75) Inventor: Jeffrey S. Lille, Sunnyvale, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/678,856

(22) Filed: Feb. 26, 2007

(65) Prior Publication Data  
US 2007/0137027 A1 Jun. 21, 2007

Related U.S. Application Data

(62) Division of application No. 10/672,094, filed on Sep. 26, 2003, now Pat. No. 7,199,973.

(51) Int. Cl.  
*G11B 5/23* (2006.01)  
*G11B 5/187* (2006.01)

(52) U.S. Cl. .......... 29/603.11; 29/603.13; 29/603.14; 29/603.27; 205/119

(58) Field of Classification Search .......... 29/603.07, 29/603.11, 603.13, 603.14, 603.2, 603.27; 360/125, 126, 128, 317, 319; 205/119  
See application file for complete search history.

(56) References Cited

U.S. PATENT DOCUMENTS

| | | | | |
|---|---|---|---|---|
| 5,285,340 A | * | 2/1994 | Ju et al. | 360/120 X |
| 5,932,082 A | * | 8/1999 | Harris et al. | 205/119 X |
| 5,986,856 A | * | 11/1999 | Macken et al. | 360/317 |
| 6,018,862 A | * | 2/2000 | Stageberg et al. | 29/603.14 |
| 6,054,023 A | * | 4/2000 | Chang et al. | 29/603.13 X |
| 6,154,345 A | * | 11/2000 | Ishiwata et al. | 360/317 |
| 6,278,580 B1 | * | 8/2001 | Sasaki | 360/317 X |
| 6,345,435 B1 | * | 2/2002 | Han et al. | 29/603.14 |

FOREIGN PATENT DOCUMENTS

EP 0 279 536 * 8/1988

* cited by examiner

*Primary Examiner*—A. Dexter Tugbang  
(74) *Attorney, Agent, or Firm*—Zilka-Kotab, PC

(57) ABSTRACT

A method for forming a head having a trailing shield that includes forming a gap layer above a pole, forming a mask above the gap layer, and forming a trailing shield above the gap layer and adjacent the mask, a throat height of the trailing shield being defined between the mask.

11 Claims, 5 Drawing Sheets

METHOD FOR MANUFACTURING A TRAILING SHIELD STRUCTURE FOR A PERPENDICULAR MAGNETIC WRITE HEAD

RELATED INVENTIONS

The present application is a divisional application of application Ser. No. 10/672,094, filed Sep. 26, 2003, now U.S. Pat. No. 7,199,973, Entitled Perpendicular Magnetic Recording Head With Trailing Shield Throat Height Less than Shaping Layer Distance From ABS, filed on Sep. 26, 2003.

FIELD OF THE INVENTION

The present invention relates to magnetic heads, and more particularly, this invention relates to a head having a trailing shield structure.

BACKGROUND OF THE INVENTION

In a typical head, an inductive write head includes a coil layer embedded in first, second and third insulation layers (insulation stack), the insulation stack being located between first and second pole piece layers. A gap is formed between the first and second pole piece layer by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

FIG. 1 illustrates, schematically, a conventional recording medium such as used with conventional magnetic disc recording systems. This medium is utilized for recording magnetic impulses in or parallel to the plane of the medium itself. The recording medium, a recording disc in this instance, comprises basically a supporting substrate 100 of a suitable non-magnetic material such as glass, with an overlying coating 102 of a suitable and conventional magnetic layer.

FIG. 2 shows the operative relationship between a conventional recording/playback head 104, which may preferably be a thin film head, and a conventional recording medium, such as that of FIG. 1.

FIG. 3 illustrates schematically the orientation of magnetic impulses substantially perpendicular to the surface of the recording medium. For such perpendicular recording the medium includes an under layer 302 of a material having a high magnetic permeability. This under layer 302 is then provided with an overlying coating 304 of magnetic material preferably having a high coercivity relative to the under layer 302.

Two embodiments of storage systems with perpendicular heads 300 are illustrated in FIGS. 3 and 4 (not drawn to scale).

The recording medium illustrated in FIG. 4 includes both the high permeability under layer 302 and the overlying coating 304 of magnetic material described with respect to FIG. 3 above. However, both of these layers 302 and 304 are shown applied to a suitable substrate 306.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 302 back to the return layer (P1) of the head 300.

FIG. 5 illustrates a similar structure in which the substrate 306 carries the layers 302 and 304 on each of its two opposed sides, with suitable recordings heads 300 positioned adjacent the outer surface of the magnetic coating 304 on each side of the medium.

It has surprisingly been found that writing transitions to the media at an off-normal axis produces more stable domains in the media. What is therefore needed is a trailing shield structure that alters the fields of flux for off-normal writing.

What is also needed is a method for producing such a trailing shield without damaging the small writing pole.

SUMMARY OF THE INVENTION

The present invention provides the desired benefits described above by providing a method for constructing standard and thin film magnetic head structures for recording and reading, and that is particularly adapted to perpendicular recording and reading. One head structure includes a write head portion for writing data to magnetic media. The write head portion includes a first pole piece with a first pole tip, a probe pole piece having a probe pole tip for emitting magnetic flux from an ABS end thereof, an insulation stack positioned between the pole pieces, at least one write coil embedded in the insulation stack, a shaping layer positioned between the probe pole piece and the insulation stack for focusing flux to the probe pole tip, a trailing shield spaced apart from the pole, the trailing shield causing the magnetic flux to enter the media at an angle from a plane perpendicular to a surface of the media facing the pole, and a return pole piece. A non-magnetic mask layer coplanar to the trailing shield defines the height of the trailing shield.

Preferably, a throat height of the trailing shield is less than a distance from the ABS end of the probe pole tip to the shaping layer. Also preferably, a ration of a distance between the probe pole tip and the trailing shield, and a distance between the ABS end of the probe pole tip and a writeable layer of the media, is between about 2:1 and about 1:2. In one embodiment, a distance between the probe pole tip and the trailing shield is less than about 50 nm.

In one embodiment, the trailing shield is not directly magnetically coupled to a back gap of the magnetic head structure. In another embodiment, the trailing shield is coupled to a back gap of the magnetic head structure. In a further embodiment, the return pole is stitched to the trailing shield at a position recessed from the ABS.

The read head portion includes a first and second shield layers and a sensor positioned therebetween. The first pole piece may also function as a shield layer for the read portion. However, it is common for the first pole and a shield layer to be separate layers.

A method for forming a head having a trailing shield includes forming a gap layer above a pole, forming a mask above the gap layer, and forming a trailing shield above the gap layer and adjacent the mask, a throat height of the trailing shield being defined between the mask.

In one embodiment, the gap layer is nonmagnetic metal, and the trailing shield is formed by plating. The trailing shield can also be overplated to a thickness higher than the mask such that the trailing shield covers a portion of the mask. A return pole can be formed such that the trailing shield is positioned between the pole and the return pole. Again, the return pole may or may not be coupled to the trailing shield. Preferably, the mask is not removed from the head.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 6:
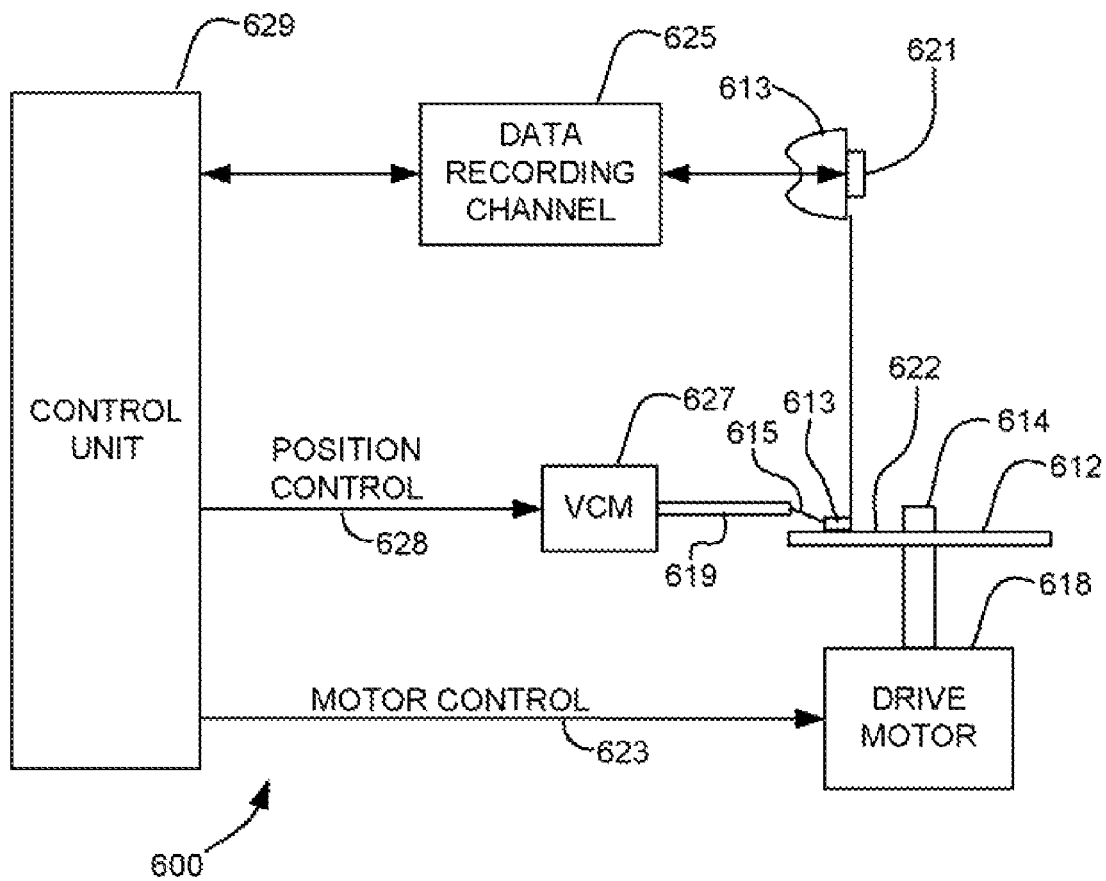
FIG. 6 is a simplified drawing of a magnetic recording disk drive system.

Referring now to FIG. 6, there is shown a disk drive 600 embodying the present invention. As shown in FIG. 6, at least one rotatable magnetic disk 612 is supported on a spindle 614 and rotated by a disk drive motor 618. The magnetic recording on each disk is in the form of an annular pattern of concentric data tracks (not shown) on the disk 612.

Figure 1:
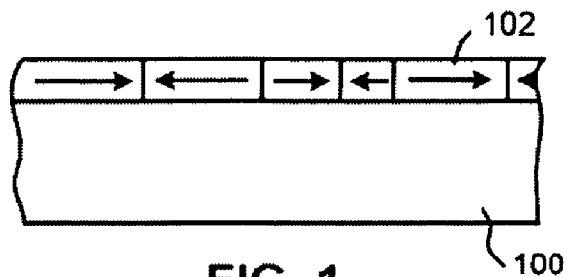
FIG. 1 is a schematic representation in section of a recording medium utilizing a longitudinal recording format.
Figure 3:
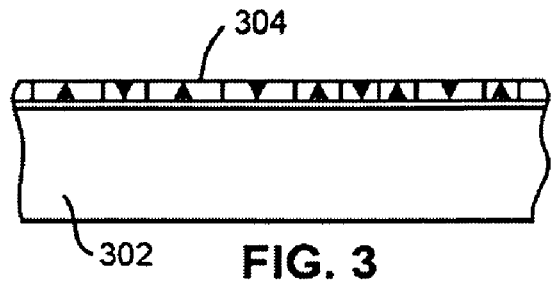
FIG. 3 is a magnetic recording medium utilizing a perpendicular recording format.
Figure 2:
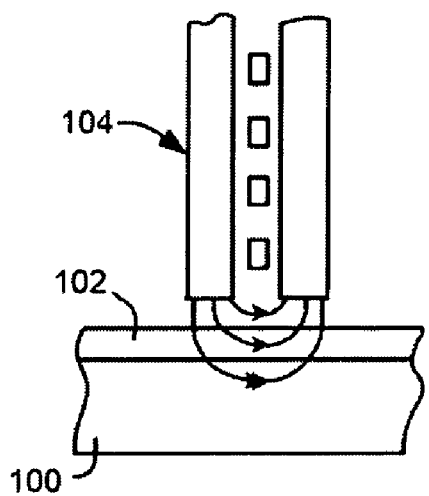
FIG. 2 is a schematic representation of a conventional magnetic recording head and recording medium combination for longitudinal recordings as in FIG. 1.
Figure 4:
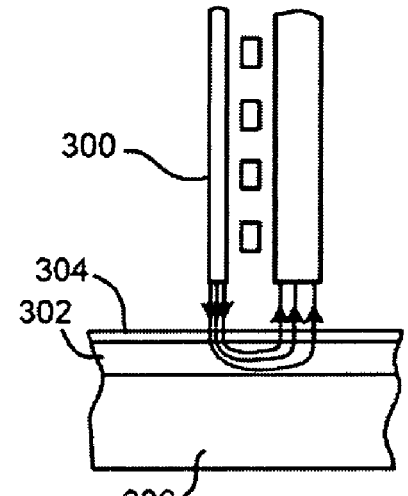
FIG. 4 is a schematic representation of a recording head and recording medium combination for perpendicular recording on one side.
Figure 5:
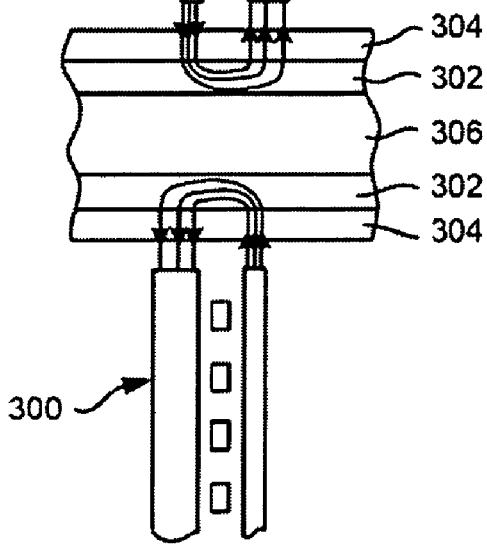
FIG. 5 is a schematic representation of the recording apparatus of the present invention, similar to that of FIG. 4, but adapted for recording separately on both sides of the medium.

At least one slider 613 is positioned near the disk 612, each slider 613 supporting one or more magnetic read/write heads 621. More information regarding such heads 621 will be set forth hereinafter during reference to the remaining FIGS. As the disks rotate, slider 613 is moved radially in and out over disk surface 622 so that heads 621 may access different tracks of the disk where desired data are recorded. Each slider 613 is attached to an actuator arm 619 by way of a suspension 615. The suspension 615 provides a slight spring force which biased slider 613 against the disk surface 622. Each actuator arm 619 is attached to an actuator means 627. The actuator means 627 as shown in FIG. 3 may be voice coil motor (VCM). The VCM comprises a coil movable within a fixed magnetic field, the direction and speed of the coil movements being controlled by the motor current signals supplied by controller 629.

During operation of the disk storage system, the rotation of disk 612 generates an air bearing between slider 613 and disk surface 622 which exerts an upward force or lift on the slider. The air bearing thus counter-balances the slight spring force of suspension 615 and supports slider 613 off and slightly above the disk surface by a small, substantially constant spacing during normal operation.

The various components of the disk storage system are controlled in operation by control signals generated by control unit 629, such as access control signals and internal clock signals. Typically, control unit 629 comprises logic control circuits, storage means and a microprocessor. The control unit 629 generates control signals to control various system operations such as drive motor controls signals on line 623 and head position and seek control signals on line 628. The control signals on line 628 provide the desired current profiles to optimally move and position slider 613 to the desired data track on disk 612. Read and write signals are communicated to and from read/write heads 621 by way of recording channel 625.

The above description of a typical disk storage system, and the accompanying illustration of FIG. 6 are for representation purposes only. It should be apparent that disk storage system may contain a large number of disks and actuators, and each actuator may support a number of sliders.

Figure 7:
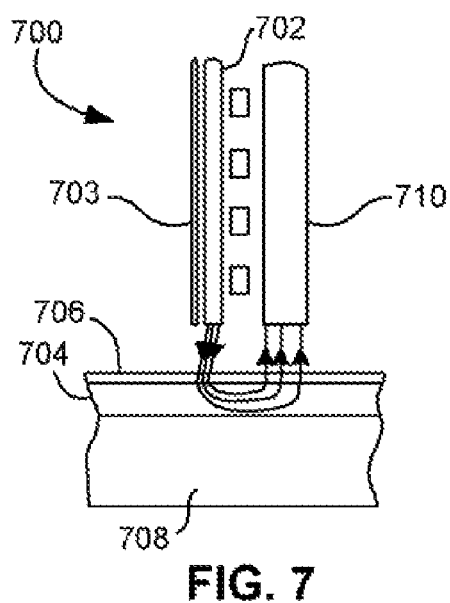
FIG. 7 is a simplified schematic representation of the improved recording apparatus of the present invention illustrating a recording head and recording medium combination for perpendicular recording on one side.

FIG. 7. illustrates schematically the orientation of magnetic impulses off-normal to an imaginary plane oriented perpendicular to the surface of the recording medium, generally in the manner provided for by the present invention. As mentioned above, it is advantageous to write transitions to the media at an off-normal axis produces more stable domains in the media, as described in N. H. Yeh, J. Magn. Soc. Jpn., V. 21, p. 269 (1997), which is herein incorporated by reference. The off-normal flux is created by the combination of a pole 702 and a trailing shield 703.

Similar to the structure recited above with respect to FIG. 3, the medium includes an under layer 704 of a material having a high magnetic permeability, preferably greater than 100, such as a permalloy material. This under layer 704 is then provided with an overlying coating 706 which contains a magnetic material preferably having a coercivity substantially greater than the under layer 704. Both of these layers 704 and 706 are shown applied to a suitable substrate 708, which may desirably be an aluminum alloy disc, although other material such as glass may also be used.

Magnetic lines of flux extending between the poles 702, 710 of the recording head 700 loop into and out of the outer surface of the recording medium coating 706 with the high permeability under layer 704 of the recording medium causing the lines of flux to pass through the coating 706 in a direction at an angle to an imaginary plane perpendicular to the surface of the medium to record information in the magnetically hard coating 706 of the medium in the form of magnetic impulses having their axes of magnetization generally perpendicular to the surface of the medium. The flux is channeled by the soft underlying coating 704 back to the return layer (P1) 710 of the head 700.

Figure 8:
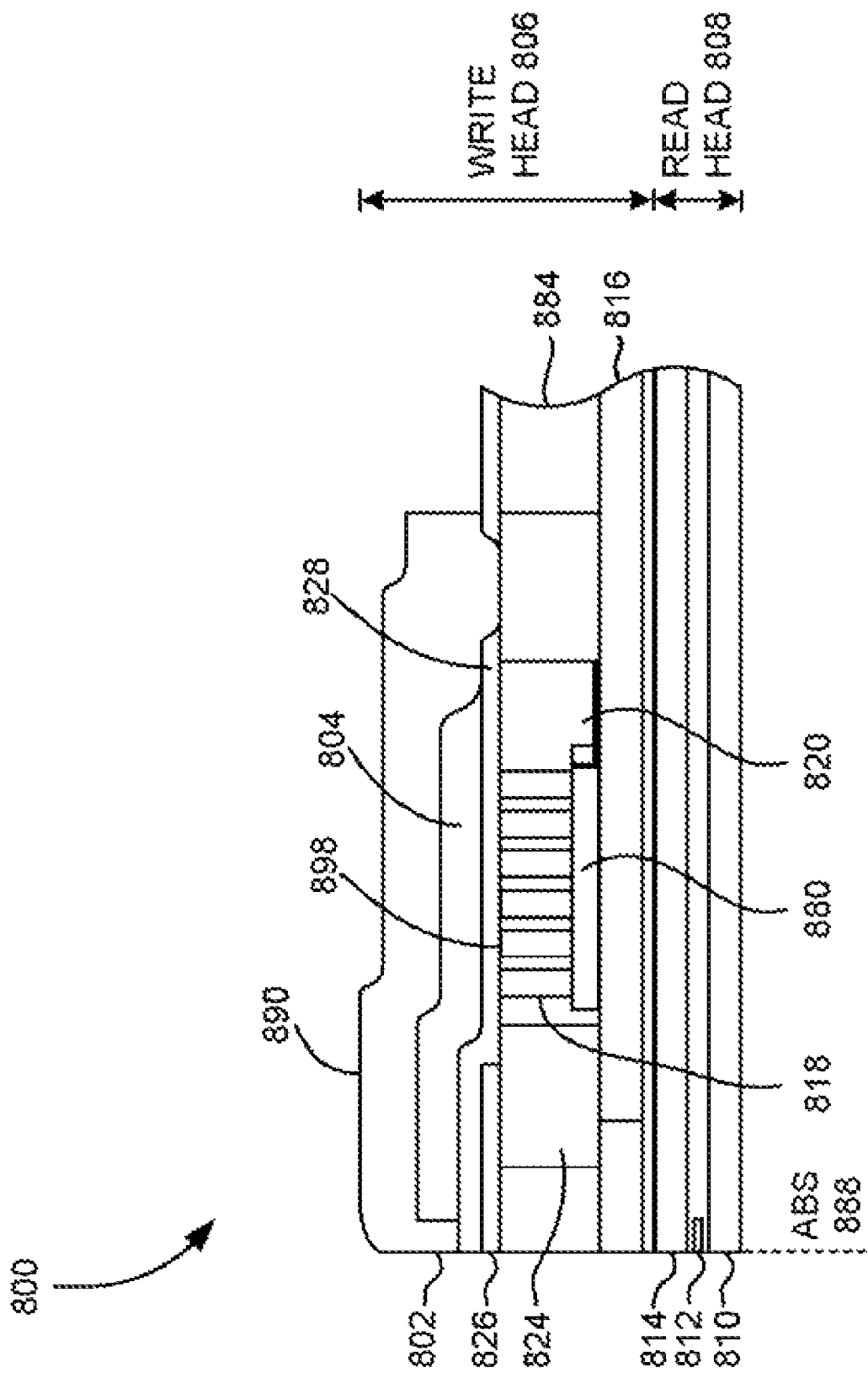
FIG. 8 is a side cross sectional view of a perpendicular read/write head structure, not to scale, according to one embodiment of the present invention.

FIG. 8 illustrates a perpendicular read/write head structure 800 having a trailing shield 802 according to one embodiment. Methods for forming the trailing shield will be discussed subsequently.

As shown in FIG. 8, a residual masking structure 804 can be created and left in the head 800 to allow for the information of the trailing shield and for the subsequent fabrication steps to build the remainder of the write head 806. Note that it is desirable to leave the masking structure 804 in the head 800 to protect the write gap and pole tip, to protect them from subsequent processing (e.g., copper coils).

In this embodiment, a read head 808 is formed first. The read head includes a first shield layer 810, a sensor 812, and a second shield layer 814. A pole 816 is formed above the first shield layer 810. A coil structure 818 and insulation layers 820, 880 are formed above the first pole layer 816. A flux shaping layer 824 is formed above the pole layer 816. A probe pole tip 826 is formed above the flux shaping layer 824 and extends to the air bearing surface (ABS) 888 of the head 800. The shaping layer 824 magnetically connects the magnetic flux from the back gap 884 to the pole tip 826. The probe pole tip 826 directs the flux into the media to perform the write function. The flux returns through the media to the return pole 890. The pole tip 826 is preferably a ferromagnetic structure with a high magnetostriction, typically CoFe, NiFe, or laminated layers (CoFe, nonmagnetic layer, CoFe, nonmagnetic layer, etc.)

A nonmagnetic gap layer 828 is formed above the probe pole tip 826. Exemplary materials for the gap layer 828 are alumina or a nonmagnetic metal such as Rh, Ru, etc. As a note, there is a need for an insulator above the coil 818 at the top surface 898 to electrically isolate the coil from the ferromagnetic pole layers. A masking structure 804 of conventional materials such as a photoresist (oxide, nitride, silanated resist, etc.) is formed above the gap layer 828. The trailing shield 802 is formed above the gap layer 828 and the masking structure 804. The trailing shield 802 is preferably constructed of a soft magnetic material, and should have a high magnetic moment. A preferred material for the trailing shield 802 is NiFe and alloys thereof.

The throat height of the trailing shield 802 is defined between the masking structure 804 and the ABS. The trailing shield 802 should have a throat height that is much less than the distance from the shaping layer 824 to the ABS end of the pole tip 826. Preferably, the throat height of the trailing shield 802 is less than about 80%, and more preferably, less than about 60% of the distance from the shaping layer 824 to the ABS end of the pole tip 826.

Also, the thickness of the gap layer 828 between the pole tip 826 and the trailing shield 802 is preferably roughly equal to the distance from the pole tip 826 to the soft underlayer of the media, though a ratio of the gap layer 828 thickness to the distance from the pole tip 826 to the soft underlayer of the media can be in the range of about 1:2 to about 2:1. An illustrative thickness of the gap layer 828 can be about 35 nm or less, but will scale with the dimensions of the pole tip 826, the dimensions being the track width and thickness of probe pole tip 826. Preferably, the thickness of the gap layer 828 will be less than about 50 nm for a track width on the order of about 0.1 microns or less.

One advantage provided by the trailing shield 802 is that because the bits in the media are written on the trailing edge of the pole tip 826, the trailing shield 802 bends the magnetic flux lines. More particularly, the magnetic field that comes out of the probe pole tip 826 enters the media at an off-normal angle, which may help write more stable bits in the media.

Figure 9:
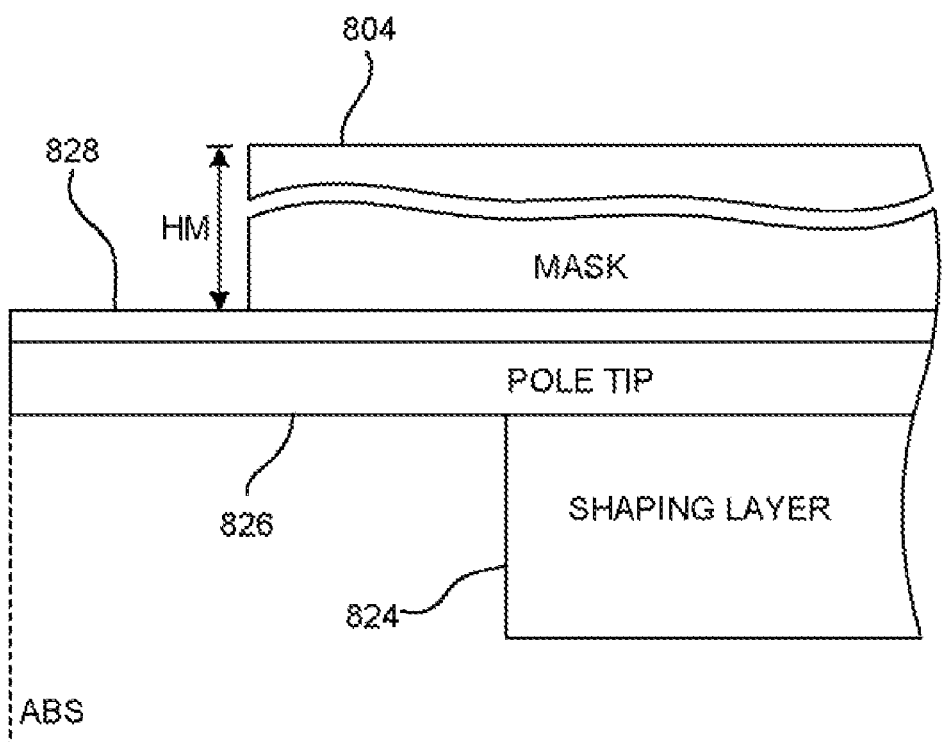
FIG. 9 is a partial side view of a perpendicular write head pole tip region, not to scale, during fabrication of a write head.

An outline of a perpendicular write head pole tip 826 region is shown in FIG. 9, where the separation of the trailing shield 802 and the pole tip 826 is a gap of non-magnetic material. In order to form the trailing shield 802, a masking structure is formed above the write gap 828. The height of masking structure (HM) is preferably substantially greater than the distance from the shaping layer 824 to the ABS. For instance, the height can be greater than about 125% the distance from the shaping layer 824 to the ABS. The reason for the tall height of the masking structure 804 is to prevent leakage of the flux into the trailing shield 802 before it reaches the ABS. A preferred height of the masking structure 804 is about 0.5 microns or more.

The masking structure 804 is preferably formed of a material that can remain in the head, such as an oxide, nitride, silanated resist (Si-containing resist) such as HSQ (hydrosilsesquioxide), etc. The mask is patterned and possibly shaped via reactive ion etching (RIE).

Figure 10:
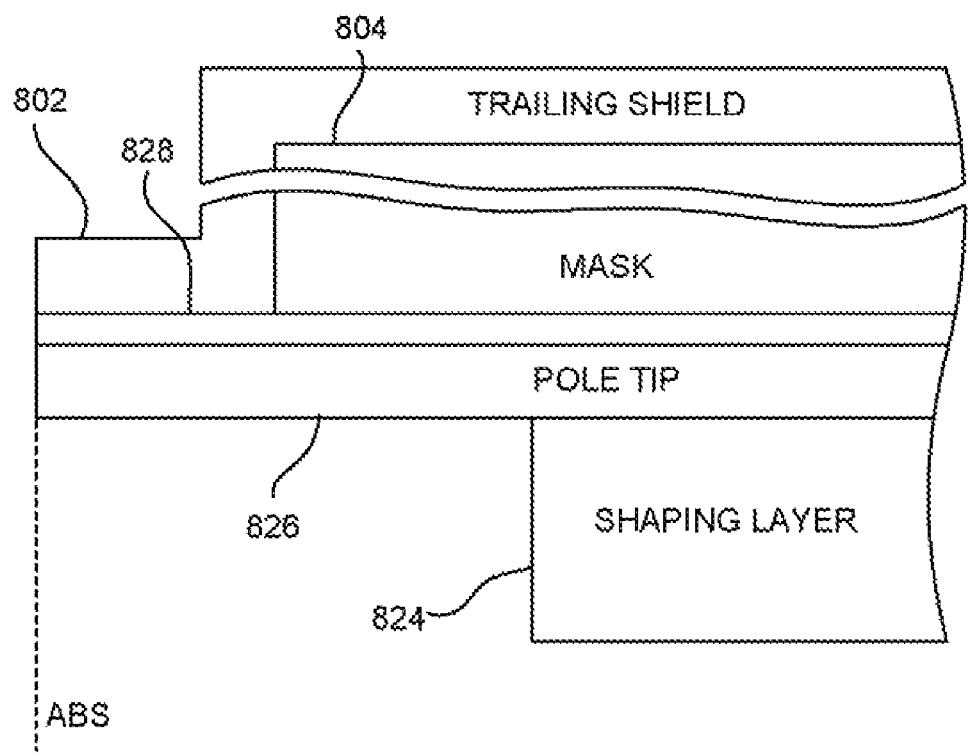
FIG. 10 is a partial side view of the perpendicular write head pole tip region of FIG. 9 upon addition of a trailing shield by deposition.

As shown in FIG. 10, the trailing shield 802 of NiFe other ferromagnetic material is deposited over and/or around the mask. For instance, if the trailing shield 802 is a sputter deposited magnetic material, the trailing shield 802 will encapsulate the masking structure 804.

Figure 11:
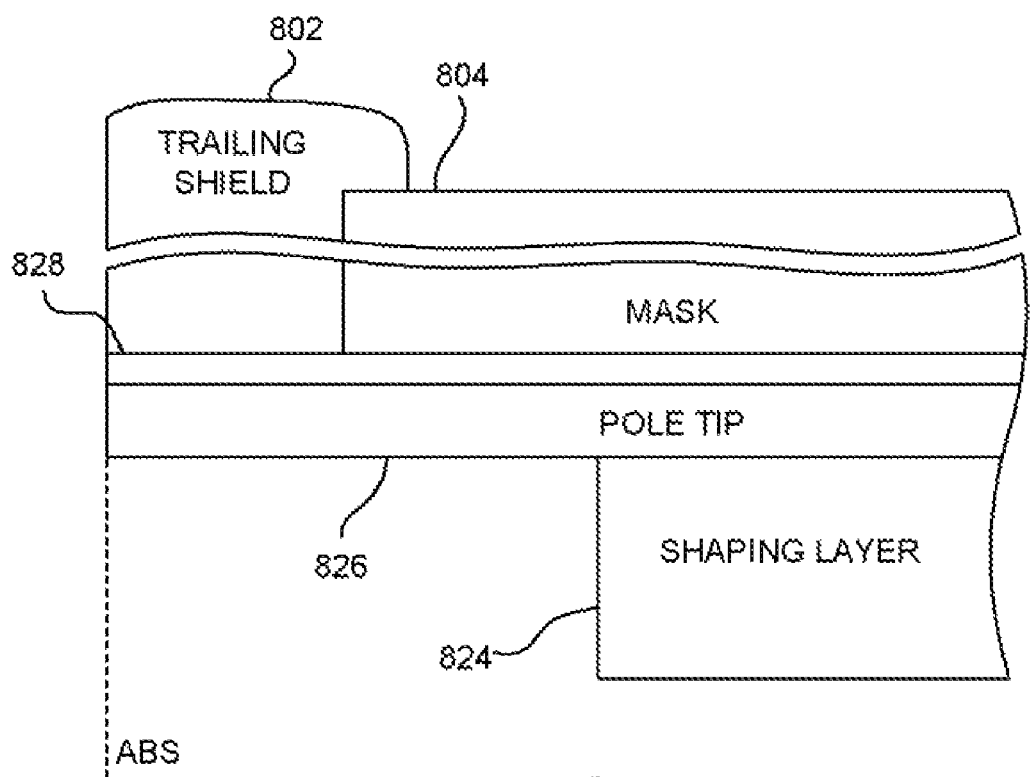
FIG. 11 is a partial side view of the perpendicular write head pole tip region of FIG. 9 upon addition of a trailing shield by plating.
Figure 12:
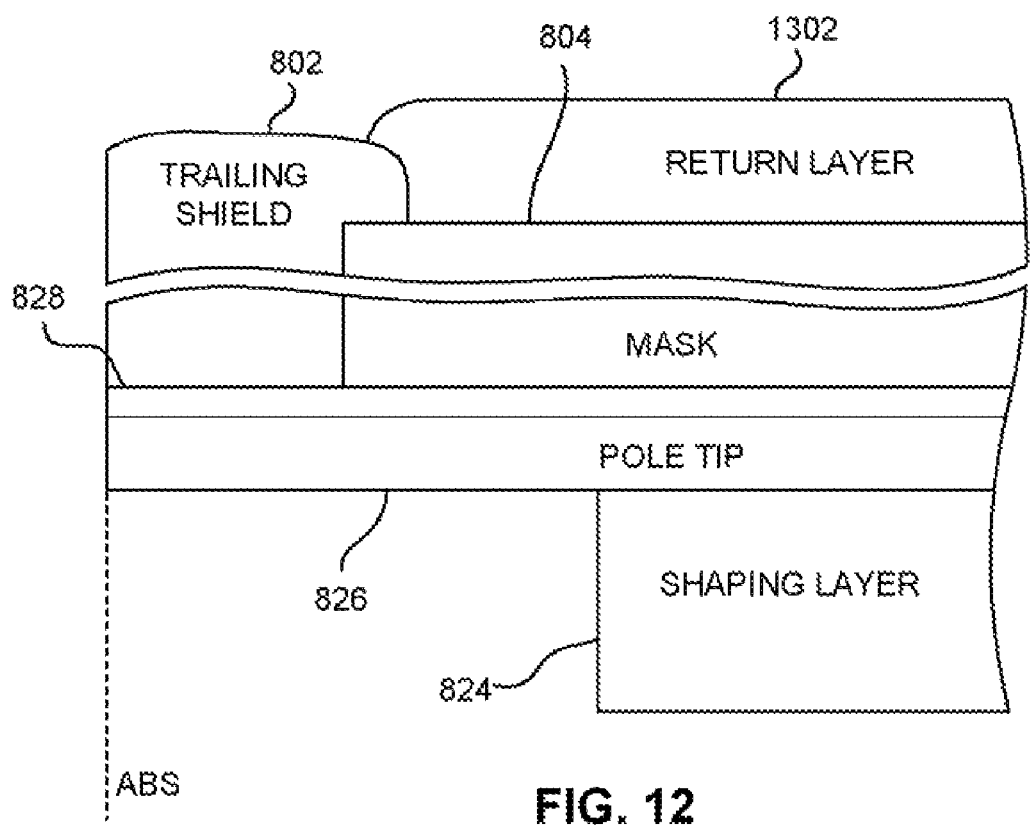
FIG. 12 is a partial side view of the perpendicular write head pole tip region of FIG. 11 upon addition of a return layer.

FIGS. 11-12 depict a method of forming a trailing shield 802 by plating. As mentioned above, the gap layer 828 between the pole tip 826 and trailing shield 802 must be nonmagnetic, e.g., of alumina or some metal such as Rh, Ru, etc. Rh and Ru are preferred because they are very conductive, and the oxide of Ru is electrically conductive so it can be plated on.

Again, a masking structure 804 is formed, preferably of a material that can remain in the head. See FIG. 10. The structure is then placed in a plating solution and the trailing shield 802 is formed by plating, resulting in the structure shown in FIG. 11. The trailing shield 802 may be overplated, such that it "mushrooms" over the edge of the masking structure 804. While the trailing shield 802 can be allowed to float, it is preferable to ferromagnetically connect the plated trailing shield 802 structure to the rest of the head. As shown in FIG. 12, the trailing shield 802 is stitched to the head by a photolithographic lift off or, as shown, forming a return layer 1302 by plating more NiFe to the plated structure. The return layer 1302 extends back to the return pole 816. Note that the location and shape of the return layer 1302 can vary, but it is preferably stitched to the return pole 816.

There has thus been described a novel head structure and methods for forming the same. One advantage provided by the present invention includes allowing trailing shield edge definition to be defined with a thin resist process. Another advantage is that the edge of shield thickness is determined by the thickness of the transfer material. Yet another advantage is that the processes disclosed herein allow a thin trailing shield 802 to be fabricated without damaging the pole tip 826. A further advantage is that the masking material is not present at the ABS surface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forming a head having a trailing shield, comprising:
   forming a magnetic return pole;
   forming a write pole that includes a write pole tip such that the write pole tip is in a trailing direction relative to the magnetic return pole, the write pole tip being configured to emit magnetic flux from an air bearing surface (ABS) in a direction that is generally perpendicular to a surface of an adjacent magnetic medium;
   forming a gap layer above the write pole tip;
   forming a non-magnetic mask above the gap layer, the non-magnetic mask having a planar front edge surface that is recessed from and coplanar with an ABS plane such that a space exists between the non-magnetic mask and the ABS plane; and
   forming a magnetic trailing shield on the gap layer and contacting the planar front edge surface of the non-magnetic mask, a throat height of the trailing shield being defined between the planar front edge surface of the mask and the ABS plane, the throat height of the trailing magnetic shield being sufficiently thin, and the gap layer being of such a thickness to allow the magnetic flux to emit from the write pole tip to the surface of the adjacent magnetic medium at a slightly off-normal angle, the trailing shield being a separate structure from the magnetic return pole.

2. A method as recited in claim 1, where the write pole also has a shaping layer coupled to the pole tip, the shaping layer for focusing flux to the pole tip.

3. A method as recited in claim 1, wherein the gap layer is a nonmagnetic metal, wherein the magnetic trailing shield is formed by plating.

4. A method as recited in claim 3, wherein the trailing shield is overplated such that the trailing shield covers a portion of the non-magnetic mask.

5. A method as recited in claim 1, further comprising forming the magnetic return pole such that the write pole is positioned between the trailing shield and the return pole.

6. A method as recited in claim 1, wherein the trailing shield is stitched to a return layer.

7. A method as recited in claim 1, wherein the non-magnetic mask is not removed from the head.

8. A method as recited in claim 1, wherein a height of the non-magnetic mask is greater than a distance from the non-magnetic mask to the ABS.

9. A method as recited in claim 2, wherein the throat height of the trailing shield is less than a distance from the ABS end of the write pole tip to the shaping layer.

10. A method as recited in claim 1, wherein a ratio of a distance between the write pole tip and the trailing shield (X), and a distance between the ABS end of the pole tip and a writeable layer of the media (Y), is such that the ratio X:Y is between about 2:1 and about 1:2.

11. A method as recited in claim 1, wherein a distance between the write pole tip and the trailing shield is less than about 50 nm.

* * * * *